United States Patent [19]

Puskas

[11] Patent Number: 5,429,465
[45] Date of Patent: Jul. 4, 1995

[54] RETAINER STRUCTURE FOR PREVENTING RELATIVE ROTATION BETWEEN FASTENER ELEMENTS

[75] Inventor: Stephen T. Puskas, Cabot, Pa.

[73] Assignee: Witco Corporation, New York, N.Y.

[21] Appl. No.: 223,710

[22] Filed: Apr. 4, 1994

[51] Int. Cl.[6] .................................. F16B 39/02
[52] U.S. Cl. .................................. 411/92; 411/966; 411/87
[58] Field of Search .............. 411/92, 87, 116, 119, 411/120, 966, 123

[56] References Cited

U.S. PATENT DOCUMENTS

| | | | |
|---|---|---|---|
| 159,136 | 1/1875 | Adgate | 411/92 |
| 370,588 | 9/1887 | Adair | 411/92 |
| 916,997 | 4/1909 | Chadwick | 411/120 |
| 1,200,297 | 10/1916 | Bates | 411/966 X |
| 1,229,783 | 6/1917 | Pogue | 411/87 X |
| 1,379,606 | 5/1921 | Ashley | 411/87 |
| 2,537,527 | 1/1951 | Heckert | 411/92 |
| 2,591,631 | 4/1952 | Stanitski | 411/966 X |
| 2,757,025 | 7/1956 | Noyes et al. | 411/966 X |
| 2,758,628 | 8/1956 | Rice | 411/87 |
| 3,351,116 | 12/1965 | Madsen . | |
| 4,475,857 | 10/1984 | Hiraiwa . | |
| 4,971,495 | 11/1990 | Dolin . | |
| 5,056,974 | 10/1991 | Dolin . | |

FOREIGN PATENT DOCUMENTS 1903 of 1887 United Kingdom ............... 411/119

Primary Examiner—Jerry Redman
Attorney, Agent, or Firm—Scully, Scott, Murphy & Presser

[57] ABSTRACT

A retainer member for inhibiting or preventing relative rotation between a plurality of fastener elements which are arranged in predetermined spaced relationship with each other, and more particularly, an apertured retainer plate for preventing the rotation of nuts which are screw-fitted onto the threaded shanks of bolts so as to facilitate the tightening and torquing or disassembling of the bolts on the nuts. Also disclosed is a plurality of the plate-shaped retainer members being arrangeable in a contiguous relationship with each other and thereby collectively defining a specified bolt circle having the apertures therein located at annular positions in conformance with bolt holes formed in structures, such as mating flanges.

15 Claims, 2 Drawing Sheets

RETAINER STRUCTURE FOR PREVENTING RELATIVE ROTATION BETWEEN FASTENER ELEMENTS

BACKGROUND OF THE INVENTION

1. Field of the Invention

The present invention relates to a retainer member for inhibiting or preventing relative rotation between a plurality of fastener elements which are arranged in predetermined spaced relationship with each other, and more particularly, relates to an apertured retainer plate for preventing the rotation of nuts which are screw-fitted onto the threaded shanks of bolts so as to facilitate the tightening and torquing of the bolts on the nuts, or alternatively, facilitate the loosening and disengagement between previously fastened together bolts and nuts.

Moreover, the invention is also directed to the provision of a plurality of the plate-shaped retainer members being arrangeable in a contiguous relationship with each other and thereby collectively defining a specified bolt circle having the apertures therein located at annular positions in conformance with bolt holes formed in structures, such as mating flanges. This enables positioning in the apertures of the retainer plates a plurality of nuts which are sized in general conformance with the shapes of the apertures, which nuts are screw-fittingly engageable by the threaded shanks of bolts for implementing the locking engagement between the mating flanges, and as a consequence of which there is enabled the tightening and torquing of the bolts on the therewith engaged nuts with minimum exerted effort and at considerable savings in expenditures of labor and time; while, conversely, there is also facilitated the loosening and disengagement between the respective fastened together bolts and nuts.

In numerous physical plants and installations; for example, such as chemical reactor systems, petrochemical manufacturing facilities or the like, among diverse other installations and processing plants requiring extensive pipe lines and attendant mating flange connections, the assembly and fastening together of such flanges through the intermediary of nuts and therewith associated screw-fitted threaded bolts becomes quite time consuming and labor intensive, inasmuch as special efforts must be expended in order to prevent the rotation of the nuts while tightening and torquing the therewith screw-fitted bolts. In essence, this normally entails the appropriate personnel; for instance, a pipefitter effecting manual gripping of each of the nuts, such as through the use of suitable wrenches or the like, and then implementing rotation of the respective bolts engaging the nuts, and torquing the bolts with suitable torquing wrenches while holding the nuts so as to be secure from rotation, to thereby provide for the necessary tightening and torquing action; or conversely, disengaging any previously fastened together bolts and nuts. This cumbersome, two-handed manual procedure frequently renders it difficult for the pipefitter to carry out the appropriate torquing, and also necessitates that each and every individual nut positioned along the bolt circle of the mating flanges must be manually held in position to inhibit respective rotation thereof during the tightening and torquing or loosening of the therewith associated bolt.

2. Discussion of the Prior Art

Although various devices are currently known in the art for inhibiting or preventing the relative rotation between adjacently located fastener members, such as nuts or bolts; for example, such as may be positioned about a bolt circle on mating flanges or the like, these fail to provide the necessary structure which will prevent relative rotation between the fastener members.

U.S. Pat. No. 3,351,116 to Madsen, in one embodiment thereof discloses a pair of interengageable plate members having central apertures into which the polygonally-shaped heads of bolts are adapted to be inserted, and whereby the projecting edges or corners of the bolt heads will contact adjoining surface portions of the respective aperture in the plate members in which they are located such that during tightening and torquing of nuts which are in screw-fitted engagement with the bolt shanks, this preventing of rotation of the bolts will facilitate the tightening process by a worker.

U.S. Pat. No. 4,475,857 to Hiraiwa discloses a detent apparatus in which a plate has polygonally-sided recesses or cutouts formed at oppositely located edges thereof, each engageable by a close-fitting hexagonal member so as to inhibit relative rotation between the hexagonal members responsive to the application of rotational moments thereto.

SUMMARY OF THE INVENTION

In order to provide a simple, inexpensive and advantageous structure which will prevent or inhibit each nut of a plurality of adjacently located nuts from rotation relative to each other, such as nuts positioned along the bolt circle of mating flanges which are lockable to each other through tightening engagement between bolts extending through aligned bolt holes in the flanges and the nuts, and which will facilitate the rapid and cost-effective tightening and torquing of the bolts into the nuts or, alternatively, the loosening and disengagement between such previously fastened together components. In this instance, the present invention contemplates the provision of at least one retainer member in the shape of a flat plate, possessing a central aperture of generally the polygonal shape of and being slightly larger than a nut adapted to be positioned therein, and whereby the opposite end edges of the retainer member also includes recesses or cutouts which are polygonally-shaped in conformance with at least one-half the periphery of a nut to be engaged therein so as to be secured against rotation. The flat plate-shaped retainer member is designed so as to define a radius of curvature between the central aperture and the cutouts at the ends of the retainer member which are adapted to each house respectively one nut, such that the nuts are positioned along the radius of curvature of a bolt circle on a flange structure for connection with a cooperating flange, with the spacings between the radial centerlines of the aperture and cutouts being in alignment with bolt holes extending through the flanges. A plurality of the plate-shaped retainer members may be positioned in contiguous relationship so as to form a complete annulus whereby the adjacent contacting end edges of each of the retainer members are angled to provide wedge-like plate shapes producing jointly complete apertures in conformance with the shape of a nut by means of mating cutouts between adjacent contacting retainer members. Consequently, the number of apertures which are formed is in correlated alignment with the bolt holes in the flanges. Thus, by simply positioning a nut in respectively each of the apertures provided by the array or annulus of retainer members, this enables a screw-threaded bolt shank to be inserted through respectively each of the bolt holes into the nuts from the side of the mating flanges distant from that mounting the retainer members, and thereafter to tighten and torque the bolts without having to restrain the nuts, inasmuch as the plate-shaped retainer members will prevent relative rotation between the nuts. As a result, this will prevent any slippage during torquing, and permit an installer or pipefitter to tighten the bolts onto the nuts from the opposite side of the mating flanges without having to engage any of the nuts, thereby facilitating a rapid tightening and controlled torquing of the bolts in the therewith associated nuts in a rapid and labor-saving manner; or to loosen such previously fastened together bolts and nuts.

Accordingly, it is an object of the present invention to provide a retainer member which will inhibit or prevent the rotation of neighboringly arranged fastener elements so as to facilitate torquing therewith of engaged cooperative fastener components which are operatively associated with each of the fastener elements.

Another object of the present invention is to provide a plate-shaped retainer member having a central aperture and opposite end cutouts each dimensioned to receive in close-fitting relationship a nut which is engageable by the threaded shank of a bolt so as to during tightening and torquing of the bolt in the respective nut prevent any relative rotation between the nuts and thereby facilitate a time and labor-saving tightening and torquing of the threaded shank portion of the bolt into the nut or, conversely, enabling loosening and disengaging such previously fastened together bolts and nuts.

Still another object of the present invention is to provide an array of contiguous of the plate-shaped retainer members as described herein, and with such array defining an annulus along the bolt circle on flange structure of mating flanges, and wherein the apertures formed by the array of retainer members are each adapted to receive respectively a nut in alignment with respectively a bolt hole extending through the flanges so as to be able to receive the threaded shank of a bolt therein, and which will enable the tightening and torquing of the bolts without having to grippingly engage and manually prevent relative rotation between the nuts during the tightening and torquing or, conversely, loosening of the therewith engaged bolts.

BRIEF DESCRIPTION OF THE DRAWINGS

Reference may now be had to the following detailed description of a preferred embodiment of a retainer member constructed pursuant to the invention, taken in conjunction with the accompanying drawings; in which:

FIG. 1 illustrates a front view of a plate-shaped retainer member for preventing the relative rotation between a plurality of neighboringly located fastener elements, such as nuts or bolts and the like;

DETAILED DESCRIPTION

Figure 1:
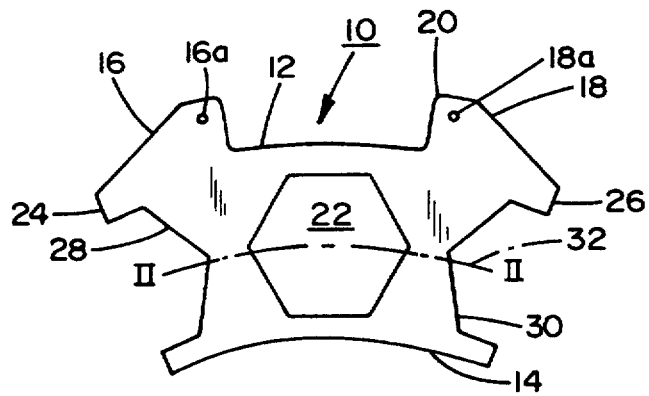
Figure 2:
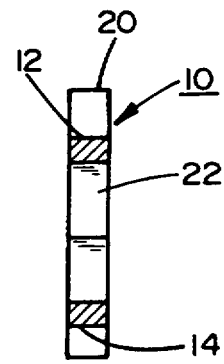
FIG. 2 illustrates a sectional view taken along line II—II in FIG. 1.

Referring now in more specific detail to FIGS. 1 and 2 of the drawings, there is illustrated a retainer member 10 which is constituted of a flat plate. Preferably, although not necessarily, the plate-shaped retainer member 10 consists of a suitable steel, for instance, such as ASTM A-36, although numerous other high-strength metals may be suitably utilized in order to fulfill the intended purposes of this invention.

The plate member 10 includes an upper convexly curvilinear surface 12 and a lower concavely curvilinear surface 14. At each end of the curvilinear surface 12 there is formed, respectively, an upwardly extending ear like protruding plate portion 16, 18, which then taper downwardly towards the side edges of the retainer member 10; in effect, the surface 12 is somewhat recessed from the outer plate edge 20. Formed in generally the center portion of the plate member 10 is an essentially polygonally-configured aperture 22 which, in this instance, is hexagonal, although other shapes, such as a square and the like can also be contemplated. The opposite end edges 24 and 26 of the plate member 10 are each provided with cutouts 28 and 30, each of which has a shape of substantially one-half the configuration of a hexagon which is similar in size to that of the central aperture 22. The side edges 24 and 26 are angled relative to each other so as to impart a wedge-like shape to the retainer member 10, tapered inwardly toward surface 14. The positioning or spacings between the centerline of central aperture 22 and the opposite end cutout 28, 30 centerlines relative to each other, as defined by edges 24, 26, is such as to define a curvilinear positioning along an imaginary circle 32 which is adapted to conform to a bolt circle on a flange on which the retainer member 10 is adapted to be positioned, as more extensively detailed hereinbelow.

Each of the earlike plate portions 16, 18 may also be respectively provided with a small through-extending hole 16a and 18a for the passage therethrough of a suitable fastening wire (not shown), as mentioned hereinbelow.

Figure 3:
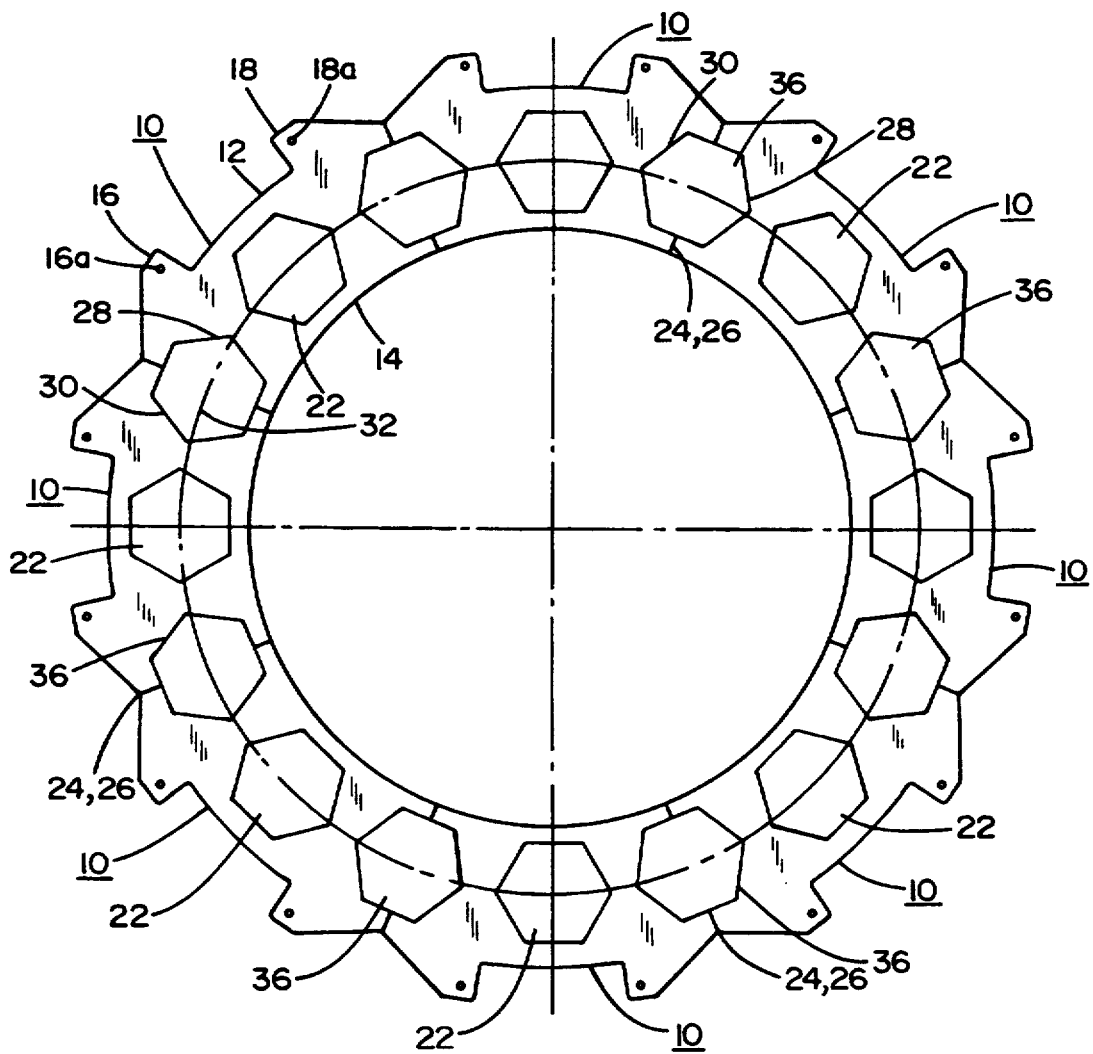
FIG. 3 illustrates an array of contiguously positioned of the retainer members pursuant to FIG. 1, adapted to form an annulus about the bolt hole circle of mating flanges so as to facilitate the tightening and torquing, or conversely loosening and disengagement between nuts and cooperating screw-threaded bolt shanks.
Figure 4:
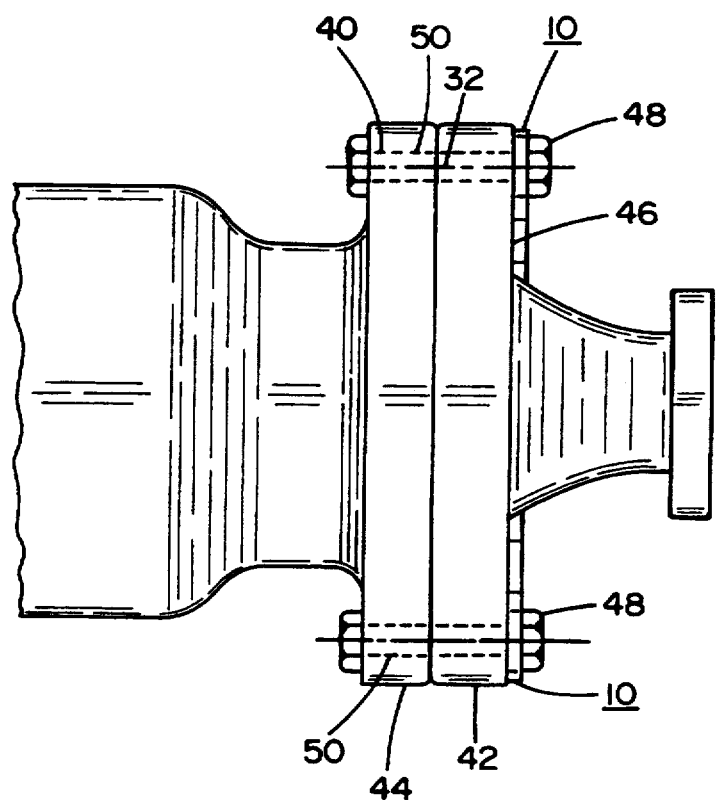
FIG. 4 illustrates a pair of mating flanges of a piping structure which are adapted to be fastened together through the intermediary of nuts and therewith engaged threaded bolts, and wherein there is utilized the array of retainer members positioned on one of the flanges for preventing relative rotation between the nuts during the tightening and torquing or loosening and disengagement of the therewith engaged bolts.

In essence, as shown in FIGS. 3 and 4, when it is desired to bolt together flanges through a plurality of bolts and nuts extending through bolt holes spaced about a bolt circle on the mating flanges, the present invention affords particular advantages.

In this instance, the retainer member 10 is adapted to be positioned in contiguous relationship with a plurality of similar or identical retainer members, as shown in FIG. 3, such that the array of retainer members 10 defines an annulus whereby the end edges 24 of each of the respective retainer members is in contact with the end edges 26 of the therewith adjoining retainer members. The resultingly paired cutouts 28 and 30 which join each other along the contacting end surfaces 24, 26 of adjoining retainer members 10 define therebetween hexagonal apertures 36 of essentially the same size as each of the central apertures 22 in plate members 10. The number of retainer members 10 forming the annulus with apertures 22 and 36 is selected through suitable dimensioning to provide angular plate sectors in which a 360° circle formed by the assembled array of retainer members; by way of example only, provides for sixteen apertures 22, 36 in an annulus constituted of eight adjoining wedge-shaped retainer members 10; which apertures are adapted to be positioned in alignment with bolt holes 40; which are sixteen in number formed in mating flanges 42 and 44 along bolt circle 32, having reference to FIG. 4 of the drawings. The plate-shaped or flat retainer members 10 are positioned in full surface contact with an external surface 46 on one of the flanges 42, and with a nut 48 (shown in phantom lines) being located in each of the respective apertures 22, 36 and screw-fittingly engageable by a threaded shank portion of a bolt 50 (shown in phantom), insert through a respective bolt hole 40 from the side of the other flange 44. Consequently, during tightening and torquing each bolt 50, it is not necessary to manually engage the nut 48 into which the respective bolt 50 is being screwed, inasmuch as the contiguous array or annulus of retainer members 10 having the nuts 48 retained in the apertures 22 and 36 therein, will prevent any relative rotation between the nuts 48, whereby it is simply necessary to tighten and torque each bolt 50 to the desired tightness or, conversely, when desired to loosen and disengage the bolts and nuts.

With respect to the foregoing, suitable wires (not shown) may be inserted through the respective holes 16a, 18a in the plate portions 16, 18 so as to interconnect the retainer members 10 with each other and/or secure the retainer members to the structures or flanges on which they are mounted.

The foregoing enables a rapid and labor-saving procedure by a pipefitter in the assembling and fastening or disassembling of flanges of suitable piping or reactor installations; for example, such as hydrotreater reactors, diverse chemical reactors, petrochemical manufacturing facilities, and other process installations possessing extensive and numerous nut and bolt fastener arrangements which may advantageously employ the inventive nut retainer members, and also including thermal process installations employed for thermal cracking, visbraking, fluid coking, delayed coking, catalytic cracking, catalytic reforming, catalytic hydrocracking, catalytic hydrorefining, alkylation, aromatics/isomerization units and hydrogen manufacturing installations, among many other installations of all types. Accordingly, the quantitative and physical applications and uses of retainer members 10 of this type are practically unlimited in the most diverse technologies.

Moreover, the retainer may be made in various suitable sizes, both individually or in complete sets, and with commensurate bolt circle radii and spacings between the respective nut-receiving apertures, the latter of which may be designed to house different nut sizes so as to be adaptable to various flange sizes and bolt circles in different installations. In this case, it may be advantageous to provide kits storing quantities of suitably sized of such retainer member over wide size ranges which would normally be employed in the above-mentioned technologies.

Furthermore, although the retainer member 10 is set forth as showing adjacent apertures 22 and cutouts 28, 30 positioned in a curvilinear bolt circle-simulating configuration, and the member 10 being wedge-shaped, such cutouts and central aperture in the retainer member may be linearly spaced, and the end edges 24, 26 extending in parallel, in the event that it is contemplated to connect structures having a plurality of linearly-arranged bolt holes and connecting locations rather than on a bolt circle.

Additionally, although the invention is illustrated by way of example in connection with hexagonal apertures 22, 36, it becomes readily apparent to one skilled in the art that any suitable polygonal configuration, such as squares or the like, may also be employed for the apertures instead of the hexagonal shapes, to receive commensurately shaped nuts 48. Additionally, in lieu of nuts 48 being positioned in the respective apertures 22, 36 which are engageable by the screw-threaded bolts 50, it may be possible to position bolt heads of polygonal configurations; for instance, square or hexagon and the like, into the apertures 22, 36 of the retainer members 10, with their shanks extending through the bolt holes, and which are engaged on the opposite sides of the mating flanges 42, 44 by suitable nuts 48 which may be torqued onto the threaded shanks of the bolts 50 which are positioned secured against relative rotation in the apertures formed in the array of retainer members 10. From the foregoing, it becomes readily apparent that the invention is directed to a unique and simple retainer structure for preventing relative rotation between pluralities of fastener elements, such as nuts, bolt heads or the like which will facilitate the tightening and torquing or disengaging of cooperating fastener members, in a rapid and cost-effective manner, and which also provides for an improved control over the torque loads and stresses imposed on the various fastener components.

While there has been shown and described what are considered to be preferred embodiments of the invention, changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed:

1. A retainer member for preventing relative rotation between a plurality of polygonally-shaped fastener elements arranged at predetermined spacings with each other, said retainer member comprising a flat plate having a central aperture of generally the shape of one said fastener element, and cutout formed in opposite end edges of said plate, each said cutout having a shape conforming to one-half the shape of respectively one of said fastener element whereby positioning one of said fastener elements within said central aperture and positioning said fastener elements in each of said respective cutouts prevents said fastener elements from being rotated relative to each other.

2. A retainer member as claimed in claim 1, wherein each said fastener element comprises a nut having an internal screwthread adapted to be matingly engaged by an externally threaded bolt shank.

3. A retainer member as claimed in claim 2, wherein each said nut comprises a hexagonal nut.

4. A retainer member as claimed in claim 3, wherein said central aperture in said plate structure comprises a hexagonal aperture, said nut being insertable into said aperture in a substantially close fit.

5. A retainer member as claimed in claim 3, wherein each of said cutouts at the opposite end edges of said plate structure possesses a shape of one-half of a hexagon.

6. A retainer member as claimed in claim 1, wherein said central aperture and each of the cutouts in the opposite end edges of said plate are spaced relative to each other so as to define a specified radius of curvature and an angular sector for positioning said fastener elements on a bolt circle having said radius of curvature.

7. A retainer member as claimed in claim 6, wherein said opposite end edges of said plate are angled relative to each other so as to narrow towards the center of said radius of curvature and impart a wedge-like shape to said retainer member.

8. A retainer member as claimed in claim 7, wherein said plate is positionable in contiguous end edge-contacting relationship with at least one of contiguously arranged plates, wherein adjoining of said cutouts in the contacting end edges of said contiguously arranged plates each conjointly form an aperture similar to said central aperture for receiving one of said fastener elements.

9. A retainer member as claimed in claim 8, wherein a plurality of said contiguously arranged plates forms an annulus of a plurality of retainer members adapted to receive respectively one of said fastener elements in each aperture in each said plate positioned about a specified bolt circle.

10. A retainer member as claimed in claim 9, wherein said annulus comprising a plurality of said plates is positionable on an external surface of a flange adapted to be fastened to a mating flange, said flange and mating flange each including aligned through-extending bolt holes each for the passage therethrough of a screwthread bolt shank engaging said fastener elements located in a respective aperture in each said plate so as to facilitate tightening and torquing of each said bolt shank in one of said fastener elements secured against rotation.

11. A retainer member as claimed in claim 10, wherein said flange mounting said annulus of plates comprises a piping component of processing installations.

12. A retainer member as claimed in claim 1, wherein at least one hole is formed in said plate for the receipt therein of a wire for securing said retainer member to another structure.

13. A retainer member as claimed in claim 1, wherein each said fastener elements comprises an enlarged polygonal head of a threaded bolt.

14. A retainer member as claimed in claim 13, wherein said bolt head is hexagonal in shape.

15. A retainer member as claimed in claim 1, wherein said plate is constituted of steel.

* * * * *

UNITED STATES PATENT AND TRADEMARK OFFICE
CERTIFICATE OF CORRECTION

PATENT NO. : 5,429,465
DATED : July 4, 1995
INVENTOR(S) : Stephen T. Puskas

It is certified that error appears in the above-indentified patent and that said Letters Patent is hereby corrected as shown below:

```
Column 6, line 59, Claim 4:   delete   "structure"

Column 6, line 64, Claim 5:   delete   "structure'
```

Signed and Sealed this

Twenty-seventh Day of February, 1996

Attest:

BRUCE LEHMAN

Attesting Officer    Commissioner of Patents and Trademarks